(12) United States Patent
Martinsen et al.

(10) Patent No.: US 8,176,675 B2
(45) Date of Patent: May 15, 2012

(54) FISHING DEVICE FOR USE IN TROLLING

(76) Inventors: Robert Martinsen, Solbergmoen (NO); Svein-Inge Stangenes, Steinberg (NO)

( * ) Notice: Subject to any disclaimer, the term of this patent is extended or adjusted under 35 U.S.C. 154(b) by 934 days.

(21) Appl. No.: 10/125,739

(22) Filed: Apr. 19, 2002

(65) Prior Publication Data

US 2002/0170226 A1    Nov. 21, 2002

(30) Foreign Application Priority Data

Apr. 19, 2001  (NO) .................................. 20011947

(51) Int. Cl.
*A01K 91/00* (2006.01)
(52) U.S. Cl. ...................... 43/43.13; 43/43.12
(58) Field of Classification Search ................. 43/43.12, 43/43.13, 26.1
See application file for complete search history.

(56) References Cited

U.S. PATENT DOCUMENTS

| | | | | |
|---|---|---|---|---|
| 1,606,240 A * | 11/1926 | Klasemer | ...................... | 43/43.13 |
| 2,363,668 A * | 11/1944 | Groen | ........................... | 114/244 |
| 2,597,288 A * | 5/1952 | Caldwell | ....................... | 43/43.13 |
| 2,825,994 A * | 3/1958 | Bruhn | ........................... | 43/43.13 |
| 2,920,414 A | 11/1958 | Koepplin | | |
| 2,901,857 A * | 9/1959 | Lockert | ........................ | 43/43.13 |
| 2,942,371 A * | 6/1960 | Johnson et. al. | ................... | 43/9.7 |
| 2,965,998 A * | 12/1960 | Kuismi | ........................ | 43/43.13 |
| 2,977,709 A * | 4/1961 | Keiter | ............................ | 43/43.13 |
| 3,044,208 A * | 7/1962 | Minera | ......................... | 43/43.13 |
| 3,181,266 A * | 5/1965 | Leufvenius | .................. | 43/43.13 |
| 3,216,147 A * | 11/1965 | Minera | ......................... | 43/43.13 |
| 3,318,038 A * | 5/1967 | Delsol | ........................... | 43/43.13 |
| 3,470,649 A * | 10/1969 | Cole | ................................ | 43/43.13 |
| 3,739,516 A * | 6/1973 | Holling | .......................... | 43/26.1 |
| 3,818,624 A * | 6/1974 | Duffy | ............................ | 43/43.13 |
| 4,028,840 A | 6/1977 | Wille | | |
| 4,282,672 A * | 8/1981 | Neary | ........................... | 43/43.13 |
| 4,763,437 A * | 8/1988 | Cuda | ............................. | 43/43.13 |
| 4,920,689 A | 5/1990 | Anderson | | |
| 5,304,005 A * | 4/1994 | Loeffler-Lenz | ................. | 405/26 |
| 5,548,919 A * | 8/1996 | Hicks | ............................. | 43/43.13 |
| 5,611,167 A * | 3/1997 | Mills | .............................. | 43/43.13 |
| 5,636,467 A | 6/1997 | Adams | | |
| 5,875,583 A * | 3/1999 | Church | ......................... | 43/43.13 |

* cited by examiner

*Primary Examiner* — Kimberly Berona
(74) *Attorney, Agent, or Firm* — Christian D. Abel

(57) ABSTRACT

A device for bringing a fishing hook attached to a line out to the side of a boat during trolling, comprising an elongated hull (5), a keel (6) and a line (7) with a release device (8), where the release device is arranged to hold the line during trolling and release the line when a fish bites on the hook.

4 Claims, 1 Drawing Sheet

FISHING DEVICE FOR USE IN TROLLING

The invention relates to a device for use in fishing from a boat in order to bring a fishing hook out to the side of the boat.

When several fishing lines and hooks are deployed from the same boat, the lines are apt to become tangled together when they trail directly behind the boat. Some types of fish are also scared by sounds and movements from the boat, thus making them more difficult to catch. In order to redress this problem, implements are employed that can hold the line with the hook out from the side of the boat when the boat is moving across the water.

Known implements are otters, paravanes and planer boards. The common feature of these is that they float in the water and have a towline between them and the boat that is pulling them. The fishing line is either attached directly to the implement or passes from the boat via the implement out into the water. A disadvantage of such known implements is that they fail to bring the line with the hook far enough out from the side of the boat, thus limiting the number of lines that can be deployed from the same boat. They also have inadequate seakeeping ability, with the result that the drag in the line is too great or they overturn, causing the line to become tangled.

U.S. Pat. No. 5,636,467 relates to a float for attaching to a fishing line in order to control the movements of a spinner or bait in the water. The float has a cylindrical main part with tapering ends and a keel/fin on the bottom. The line passes from the boat out to the float where it runs through an arm located at the front on the top of the float, continues to the tail portion and on through a line holder in the lower part of the keel. The float is fastened to the desired part of the line and does not run freely. The line attached in the line holder in the keel may be placed in several positions in order to optimise the passage of the spinner/bait through the water. It is not possible here to adjust the amount of line trailing behind the float during the course of the trolling operation, and this is something that will be desirable for adjustment of the trolling speed.

U.S. Pat. No. 4,028,840 relates to a board, which can be towed by a boat and hold a fishing line out from the side of the boat, and consists of an elongated floating part that is divided into cells, which can be filled with ballast as required in order to stabilise and compensate for the weight of the device to be employed.

The board has to be towed by means of a separate towline, and not by means of the fishing line alone, which complicates the operation. Nor does it have the same good seakeeping ability as the present invention and will not be able to be brought as far out to the side of the boat.

U.S. Pat. No. 2,920,414 relates to a device for controlling a fishing line, and consists of an elongated float with a main part and a conical front portion and a keel that is attached to the bottom of the main part and extends on behind the float. The keel has a bent lower part for stabilising the float and preventing lateral movements and for keeping the front part down during towing at great speed. The float is attached to the boat by a line, and the fishing line runs freely through a sliding part on the top of the main part.

This device is towed by means of an extra line and not only by means of the fishing line. It has a complicated design and does not have the possibility of adjusting the pull as required.

The object of the invention is to provide a device that brings a fishing hook sufficiently far out to the side of a boat during trolling without applying excessive forces to the fishing line being used. The term fishing hook here refers to a spinner, baited hook, wobbler, or the like. A further object of the invention is to provide a device that can be towed by means of the fishing line alone and where the pull can be adjusted.

This object is achieved by means of the features described in the independent claim and the following dependent claims.

The invention will now be described with reference to the accompanying drawings where:

Figure 1:
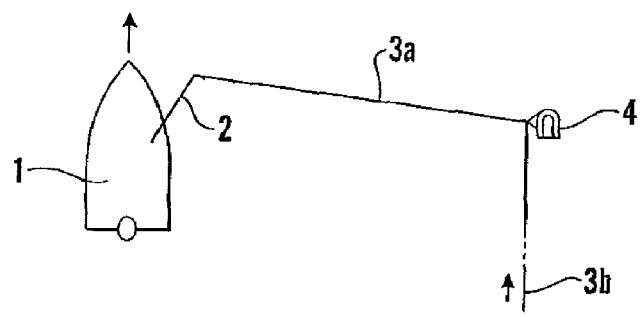
FIG. 1 illustrates how the paravane according to the invention is used when fishing from a boat.

In FIG. 1 a fisherman with a fishing rod 2 is on board a boat 1. A fishing line 3*a* from the fishing rod 2 runs via the paravane 4 out into the water at the side of the boat. The paravane 4 is attached to the boat only by means of the fishing line 3*a*. When the fish bites on the hook 3*b* at the end of the fishing line 3*a*, the line is released, thus enabling the fish to be pulled in without hindrance from the paravane. The paravane subsequently has to be recovered in order to continue fishing.

Figure 2:
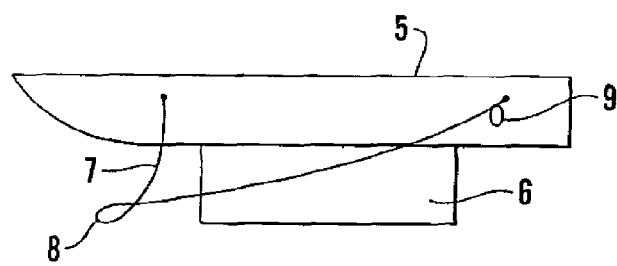
FIG. 2 is a side view of the paravane according to the invention.

FIG. 2 illustrates a side view of the paravane according to the invention consisting of a boat-shaped hull 5 to the bottom of which is fixed a keel 6. On the side of the hull, an attachment loop 7 is fastened at two points. On the attachment loop 7 is affixed a release device 8 through which the fishing line runs during fishing and which is released when a fish bites on the hook. The release device may, e.g. be a clamp, which is clamped over the attachment loop, but which is adjusted so that the fish pulling on the fishing line jerks the fishing line out of the clamp. An eyelet 9 may also optionally be affixed to the attachment loop through which the fishing line can also run, thus enabling the paravane to hang passively on the fishing line when the fish is pulled in. It is possible to mount both the keel 6 and the attachment loop 7 on both sides of the hull, thereby permitting the paravane to be employed on both sides of the boat.

Figure 3:
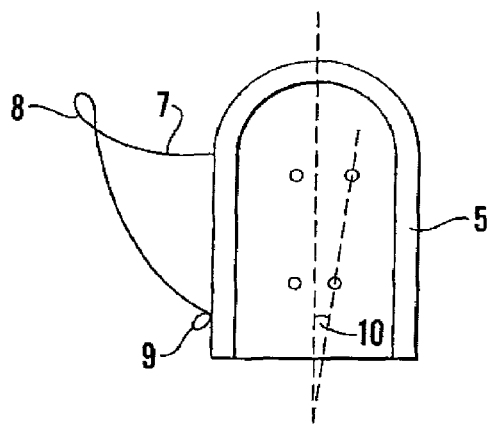
FIG. 3 is an elevational view of the paravane according to the invention.
Figure 4:
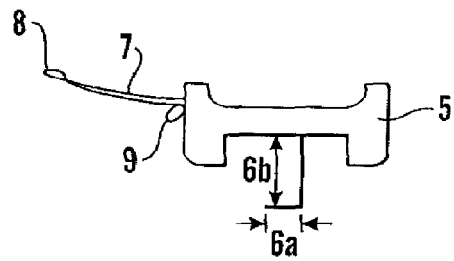
FIG. 4 illustrates the paravane according to the invention viewed from behind.

The keel 6 is mounted by means of through-going screws 10, illustrated in FIG. 3. The axis through the screws 10 is displaced laterally and offset at an angle 11 other than zero in relation to the hull's centre line. This placement causes the paravane to move far out to the side of the boat at speed without the drag in the rod becoming too great. The ideal size of the angle depends on the use, and will preferably be >15°. When the sea is rough it is an advantage to have a larger angle than in calm water. As illustrated in FIG. 4 the keel 6 comprises two surfaces, where one is perpendicular to the bottom of the hull and the other, mounted at the bottom of the perpendicular surface, is parallel to the bottom of the hull, thus giving the paravane smooth running in the water and preventing it from "lifting" due to a high trolling speed or waves. The ratio between the lengths of the keel's perpendicular 6*b* and horizontal 6*a* surfaces is adapted to provide these properties and in a preferred embodiment 6*b* will be 7 cm and 6*a* 4 cm.

The release device 8 can be affixed anywhere on the attachment loop 7 in order to provide the desired pull and thereby an adjustment of the distance to the boat. When the release device 8 is moved forwards along attachment loop 7, the pull becomes less and when it is moved backwards, the pull is increased. In an optimal position of the release device 8, the angle 12 out to the paravane from the boat may be up to 70-80°, as illustrated in FIG. 1, which is substantially larger than for the previously known implements.

The invention claimed is:

1. A device for bringing a fishing hook attached to a fishing line out to the side of a boat during trolling, wherein the device comprises, an elongated hull (5), a keel (6), an attachment loop (7), said attachment loop being connected to one side of said hull at two points, the first point located relatively forward along the hull, and the second point located relatively aft along the hull, and a release device (8) affixed to attachment loop (7), wherein said release device is arranged to hold the fishing line such that the fishing line itself provides the towing force to the device during trolling and wherein the release device is positioned on the attachment loop such that the towing force of the fishing line causes the keel to assume an oblique angle with respect to the flow of water during trolling, and wherein said release device is further arranged to release the line when a fish bites on the hook such that the fishing line becomes disengaged from the release device and ceases to exert a towing force on the device.

2. The device according to claim 1, wherein release device (8) is a clamp moveably affixed to the attachment loop (7) such that the angle at which the keel assumes with respect to the flow of water may be preselected.

3. The device according to claim 2, wherein the hull comprises two pontoons joined by a horizontal member, and wherein the keel (6) comprises:

a flat vertical member (6b) attached perpendicularly to the bottom of hull (5) in such a manner that the plane defined by the surface of vertical member (6b) is offset from the centreline of hull (5) by an acute angle (11), and a flat horizontal member (6a) attached to the bottom of vertical member (6b) such that the surface of horizontal member (6a) is parallel to the bottom of hull (5).

4. The device according to either of claims 1-3 further comprising an eyelet (9) affixed to attachment loop (7), wherein the fishing line passes through the eyelet, such that in the event the fishing line becomes disengaged from the release device the fishing line will be slidingly connected to the eyelet and the device will thus be passively connected to the fishing line.

* * * * *